(12) United States Patent
Miyoshi et al.

(10) Patent No.: US 8,822,083 B2
(45) Date of Patent: Sep. 2, 2014

(54) NEGATIVE ELECTRODE FOR LITHIUM-ION SECONDARY BATTERY AND MANUFACTURING PROCESS FOR THE SAME

(75) Inventors: Manabu Miyoshi, Kariya (JP); Hitotoshi Murase, Kariya (JP); Keiichi Hayashi, Kariya (JP); Shinji Suzuki, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 13/497,717

(22) PCT Filed: Sep. 1, 2010

(86) PCT No.: PCT/JP2010/065447
§ 371 (c)(1),
(2), (4) Date: Mar. 22, 2012

(87) PCT Pub. No.: WO2011/037013
PCT Pub. Date: Mar. 31, 2011

(65) Prior Publication Data
US 2012/0177992 A1 Jul. 12, 2012

(30) Foreign Application Priority Data
Sep. 25, 2009 (JP) ................. 2009-220519

(51) Int. Cl.
*H01M 2/16* (2006.01)
*H01M 4/02* (2006.01)
*B05D 5/12* (2006.01)
*H01M 4/88* (2006.01)

(52) U.S. Cl.
USPC ............ 429/254; 429/209; 429/252; 427/77; 502/101

(58) Field of Classification Search
None
See application file for complete search history.

(56) References Cited

U.S. PATENT DOCUMENTS

| | | | | |
|---|---|---|---|---|
| 5,538,793 | A * | 7/1996 | Inokuchi et al. | 428/407 |
| 2011/0244326 | A1 * | 10/2011 | Murase et al. | 429/217 |

FOREIGN PATENT DOCUMENTS

| | | |
|---|---|---|
| CN | 101165948 A | 4/2008 |
| EP | 1 123 944 A1 | 1/2008 |
| EP | 2 267 824 A1 | 12/2010 |
| EP | 2 490 285 A1 | 8/2012 |
| JP | 2006-185728 A | 7/2006 |
| JP | 2007-165079 A | 6/2007 |
| JP | 2009-043678 A | 2/2009 |
| WO | 03/100888 A1 | 12/2003 |

OTHER PUBLICATIONS

Chinese Non Final Office Action dated Jan. 13, 2014 issued in Chinese Patent Application No. 201080042087.9.
Extended European Search Report dated Jul. 4, 2014 issued in corresponding European patent application No. 10818689.1.
European Extended Search Report dated Jul. 7, 2014 issued in corresponding European patent application No. 14164918.6.

* cited by examiner

*Primary Examiner* — Milton I Cano
*Assistant Examiner* — Sarah A Slifka
(74) *Attorney, Agent, or Firm* — Sughrue Mion, PLLC (57) ABSTRACT

A negative electrode for a lithium-ion secondary battery, has a current collector and an active-material layer bound on a surface of the current collector. The active-material layer includes active materials, binders, conductive additives, and buffer materials. The active materials include Si and/or Sn, and the buffer materials comprise a silicone composite powder in which a spherical silicone-rubber powder is covered with a silicone resin.

3 Claims, 5 Drawing Sheets

NEGATIVE ELECTRODE FOR LITHIUM-ION SECONDARY BATTERY AND MANUFACTURING PROCESS FOR THE SAME

CROSS REFERENCE TO RELATED APPLICATIONS

This application is a National Stage of International Application No. PCT/JP2010/065447 filed on Sep. 1, 2010, which claims priority from Japanese Patent Application No. 2009-220519 filed Sep. 25, 2009, the contents of all of which are incorporated herein by reference in their entirety.

TECHNICAL FIELD

The present invention is one which relates to a negative electrode for lithium-ion secondary battery, and to a manufacturing process for the same.

BACKGROUND ART

Since downsizing and weight saving of electronic devices have been advancing, secondary batteries whose energy density is high have been desired for their power source. A secondary battery is one that takes out chemical energy, which the positive-electrode active material and negative-electrode active material possess, to the outside as electric energy by means of chemical reaction through electrolyte. In such secondary batteries, lithium-ion secondary batteries are secondary batteries, which possess a higher energy density, among those that have been put in practical use.

For lithium-ion secondary battery, lithium-containing metallic composite oxides, such as lithium-cobalt composite oxides, have been used mainly as an active material for the positive electrode. As for an active material for the negative electrode, carbonaceous materials, which have a multi-layered structure that enables the insertion of lithium ions between the layers (i.e., the formation of lithium intercalation complex) and the discharge of lithium ions out from between the layers, have been used mainly.

The electrode plates for positive electrode and negative electrode are made in the following manner: these active materials, a binder resin and a conductive additive are dispersed in a solvent to make a slurry, respectively; then the resulting slurries are applied onto opposite faces of a metallic foil, namely, a current collector; and then the solvent is dry removed to form mixture-agent layers; and thereafter the resulting mixture-agent layers and current collector are compression molded with a roller pressing machine.

Moreover, as the negative-electrode active material for lithium-ion secondary battery, the development of next-generation negative-electrode active materials, which possess a charge/discharge capacity that greatly exceeds the theoretical capacity of carbonaceous material, has been advanced recently. For example, materials that include a metal, such as Si or Sn, which is capable of alloying with lithium, are regarded prospective.

In the case of using Si or Sn, and so forth, for an active material, since these materials exhibit a great volumetric change that is accompanied by the occlusion/release of Li at the time of charging/discharging, it is difficult to maintain the bonded state to current collector satisfactorily. Moreover, these materials exhibit a very large rate of volumetric change that is accompanied by the insertion and elimination of lithium, and repeat expansion and contraction due to charging/discharging cycle. Since their active-material particles have been pulverized finely, or have come to be detached, by means of the expansion and contraction of the active material, these materials are associated with such a drawback that the cyclability degradation is great considerably.

Consequently, various combinations of binder resins and active materials have been investigated in order to make the active materials less likely to come off or fall down.

In Patent Literature No. 1, an electrode for secondary battery is proposed, electrode which uses an alkoxy group-containing resin as a binder resin.

Patent Literature No. 1: Japanese Unexamined Patent Publication (KOKAI) Gazette No. 2009-43,678

DISCLOSURE OF THE INVENTION

Assignment to be Solved by the Invention

As set forth in Patent Literature No. 1, although the combinations of active materials and binder resins that bind them together have been investigated variously, a negative electrode for lithium-ion secondary battery has been sought for, negative electrode which employs a next-generation active material in which there is still much room for upgrading the cyclability, and which is much better in the cyclability.

The present invention is one which has been done in view of such circumstances, and it is an object to provide a negative electrode for lithium-ion secondary battery, negative electrode which has better cyclability by furthermore suppressing the active material, which exhibits a large volumetric change that is accompanied by the insertion and elimination of lithium, from coming off or falling down from the current collector, and a manufacturing process for the same.

Means for Solving the Assignment

As a result of earnest studies being made by the present inventors, they found out that it is possible to provide a negative electrode for lithium-ion secondary battery, negative electrode which has excellent cyclability when an active-material layer includes a buffer material comprising a silicone composite powder in which a spherical silicone rubber powder is covered with a silicone resin.

Specifically, a negative electrode for lithium-ion secondary battery according to the present invention is characterized in that, in a negative electrode for lithium-ion secondary battery, the negative electrode having a current collector and an active-material layer being bound on a surface of the current collector, the active-material layer includes an active material, a binder, a conductive additive, and a buffer material;

the active material includes Si and/or Sn; and the buffer material comprises a silicone composite powder in which a spherical silicone-rubber powder is covered with a silicone resin.

The aforementioned silicone composite powder is excellent in the shock absorbing property. Consequently, it is believed that, by means of including the aforementioned silicone composite powder as the buffer material in the aforementioned active-material layer, it absorbs the volumetric change that is accompanied by the occlusion/release of Li at the time of charging/discharging, and then suppresses the active material from coming off or falling down.

It is preferable that the binder can include a polyimide resinous cured substance, or an alkoxy group-containing silane-modified polyimide resinous cured substance. Since the binder possesses a polyimide framework, the binder exhibits a high strength and is excellent in the heat resistance and durability.

Since an alkoxy group-containing silane-modified polyimide resinous cured substance is a hybrid of resin and silica, it exhibits good adhesiveness to all of the inorganic components, that is, the current collector, the active material and the conductive additive as well as to the buffer material, and can firmly hold the active material, and the like, on the current collector.

It is preferable that the aforementioned buffer material can be contained in an amount of from 1% by mass to 20% by mass when a total amount of the active-material layer is taken as 100% by mass.

By means of containing the aforementioned buffer material in an amount of from 1% by mass to 20% by mass, it is possible to adapt the negative electrode into one which is of high capacity and is excellent in the cyclability. When the buffer material is contained in an amount of more than 20% by mass, the content of the active material decreases, and thereby the battery capacity becomes less. Moreover, when the buffer material is contained in an amount of less than 1% by mass, the cyclability becomes worse.

Figure 1:
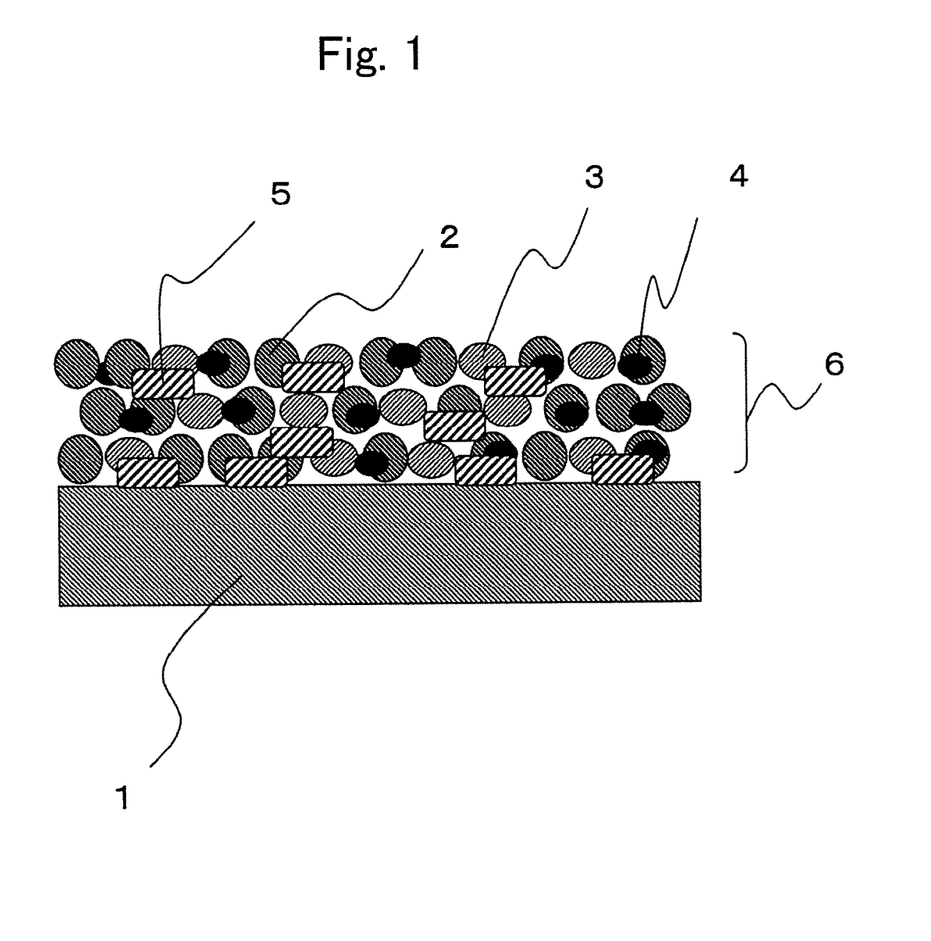
FIG. 1 is a schematic diagram that explains a negative electrode for lithium-ion secondary battery according to the present invention.

Here, the active-material layer is explained using FIG. 1. FIG. 1 is a schematic diagram in which active materials 2, buffer materials 3 and conductive additives 4 are bound on a current collector 1 via binders 5 so that an active-material layer 6 is formed on the current collector 1.

As illustrated in this FIG. 1, it is believed that, since the buffer materials 3 disperse in the obtained active-material layer 6, the buffer materials 3 absorb the volumetric change that is accompanied by the occlusion/release of Li at the time of charging/discharging, and then suppress the active materials 2 from coming off or falling down.

A manufacturing process for negative electrode for lithium-ion secondary battery according to the present invention has:

an applying step of applying a binder resin comprising a polyimide resin or an alkoxy group-containing silane-modified polyamic acid resin, an active material including Si and/or Sn, a conductive additive, and a buffer material comprising a silicone composite powder in which a spherical silicone-rubber powder is covered with a silicone resin onto a surface of a current collector; and a curing step of curing the binder resin, which has been applied on the current collector, in a range of from 150° C. or more to 300° C., or less, thereby binding the active material, the conductive additive and the buffer material on the surface of the current collector.

By means of using a polyimide resin or an alkoxy group-containing silane-modified polyamic acid resin for the binder resin, it is possible to adapt the binder resin into one which has a polyimide framework.

Since the binder possesses a polyimide framework, the binder exhibits a high strength and is excellent in the heat resistance and durability.

Moreover, since an alkoxy group-containing silane-modified polyamic acid resin is a hybrid of resin and silica, it exhibits good adhesiveness to all of the inorganic components, that is, the current collector, the active material and the conductive additive as well as to the buffer material. Consequently, the resulting alkoxy group-containing silane-modified resinous cured substance can firmly hold the active material, the conductive additive, and the like, on the current collector.

At the aforementioned curing step, the binder resin is cured in a range of from 150° C. or more to 300° C. or less. By means of adapting the temperature range into this one, it is possible to cure the binder resin while keeping the buffer material in the powdery configuration.

Moreover, a polyimide resin or an alkoxy group-containing silane-modified polyamic acid resin serving as the binder resin has an amide acid group. In these binder resins having an amide acid group, the amide acid group is imidized by means of being heated at 150° C. or more. On this occasion, even when the curing temperature is a temperature falling in a range that is lower than 400° C., the ordinarily recommended curing temperature for amide acid group, it is possible to cure the binder resin.

Moreover, it is believed that the silicone composite powder, one of buffer materials, shows rubber elasticity in a range of from −50° C. to 300° C.

Therefore, from the perspective of upgrading the cyclability, it is preferable to adapt the temperature range into from 150° C. or more to 300° C. or less at the aforementioned curing step, furthermore preferably, from 200° C. or more to 300° C. or less.

In accordance with such a manufacturing process, the active material can be suppressed from coming off or falling down from the current collector's surface. Consequently, it is possible to manufacture a negative electrode for lithium-ion secondary battery that is excellent in the cyclability.

Effect of the Invention

By means of adapting a negative electrode into the negative electrode for lithium-ion secondary battery according to the present invention, it is possible for the negative electrode to demonstrate excellent cyclability.

| Explanation on Reference Numerals | |
| --- | --- |
| 1: | Current Collector; |
| 2: | Active Material; |
| 3: | Buffer Material; |
| 4: | Conductive Additive; |
| 5: | Binder; |
| 6: | Active-material Layer; |
| 10: | Electrode Assembly; |
| 11: | Electrode; |
| 16: | Counter Electrode; and |
| 19: | Separator |

MODES FOR CARRYING OUT THE INVENTION

A negative electrode for lithium-ion secondary battery according to the present invention has a current collector, and an active-material layer being bound on a surface of the current collector. The active-material layer includes an active material, a binder, a conductive additive, and a buffer material. The active material includes Si and/or Sn. The buffer material comprises a silicone composite powder in which a spherical silicone-rubber powder is covered with a silicone resin.

The "current collector" refers to a chemically-inactive highly-electron-conductive body for keeping electric current flowing to electrodes during discharging or charging. The current collector is formed as a configuration, such as a foil or plate that is formed of a highly-electron-conductive body. The configuration is not limited to above especially as far as it is a configuration that fits for the objective. As for the current collector, it is possible to name copper foils, aluminum foils, and the like, for instance.

The "active material" refers to a substance that contributes directly to electrode reactions, such as charging reactions and discharging reactions. The active material according to the present invention is Si and/or Sn into which lithium can be inserted and from which it can be eliminated.

Si and Sn have a powdery configuration, respectively, and are applied to and then bound on the current collector's surface via the binder resin. It is preferable that a powdery particle diameter of Si and Sn can be 100 μm or less. Moreover, it is more preferable that a powdery particle diameter of Si and Sn can be from 0.05 μm or more to 10 μm or less. In addition, since it is preferable that the active material and the buffer material can have comparable sizes to each other in order to alleviate the volumetric change of the active material, it is more preferable that a powdery particle diameter of Si and Sn can be from 1 μm or more to 10 μm or less, and it is furthermore preferable that it can be from 1 μm to 5 μm.

The theoretical capacity of carbon, which has been used commonly for an active material for negative electrode, is 372 mAhg$^{-1}$, whereas a theoretical capacity of Si is 4,200 mAhg$^{-1}$ and that of Sn is 994 mAhg$^{-1}$. Thus, Si and Sn exhibit a high-capacity theoretical capacity, respectively, compared with carbon that has been heretofore used conventionally.

However, Si and Sn exhibit twice or more of the volumetric change that is accompanied by the insertion of lithium, compared with those of the carbonaceous materials. To be concrete, in the case of Si and Sn, their volumes become about four times as much as their original volumes due to the insertion of lithium.

As for the conductive additive, it is possible to add the following, namely, carbonaceous fine particles: carbon black, graphite, acetylene black, KETJENBLACK, carbon fibers, and the like, independently; or to combine two or more species of them to add.

As for the buffer material, a silicone composite powder in which a spherical silicone-rubber powder is covered with a silicone resin is used. The "silicone" is a generic name of polymer organo polysiloxane, one of organic silicone compounds that have siloxane bonds, —Si($R^1$, $R^2$)—O—, as the framework, and a methyl group, a vinyl group or a phenyl group, and the like, is bonded to these as an organic group $R^1$ or $R^2$. Beginning with low-molecular-weight silicone oils, the silicone is classified into silicone greases, silicone rubbers, and silicone resins, depending on their molecular weights.

The spherical silicone-rubber powder is a fine powder of silicone rubber possessing a structure in which straight-chain dimethyl polysiloxane is crosslinked. Compared with the other rubbers, the spherical silicone-rubber powder is excellent in the heat resistance, cold resistance and light resistance, and shows rubber elasticity in a wide temperature range of from −50° C. to 250° C.

As the structure in which straight-chain dimethyl polysiloxane is crosslinked, it is possible to name those having blocks of linear polyorganosiloxane, which is expressed with a general formula, —($R^3{}_2$SiO)$_a$—, in the molecular structural formula. Here, $R^3$ can be one member or two members or more being selected from the group consisting of the following: monovalent organic groups comprising carbon atoms in a quantity of from 1 to 20 and being selected from the group consisting of alkyl groups, such as methyl, ethyl, propyl, butyl, pentyl, hexyl, heptyl, octyl, decyl, dodecyl, tetradecyl, hexadecyl and octadecyl; cycloalkyl groups, such as cyclopentyl, cyclohexyl and cyclooctyl; aryl groups, such as phenyl and tolyl; or the monovalent organic groups in which halogen atoms substitute partially for the hydrogen atoms being bonded to the carbon atoms; and the like. However, it is preferable that 90% by mol or more of them can be a methyl group. Moreover, since it turns into one that is poor in the superficial smoothness when the value "a" is less than 5, and since it is difficult to produce those whose value "a" exceeds 5,000, the value "a" can be from 5 to 5,000, and it can preferably be from 10 to 1,000.

A silicone composite powder being used in the present invention is one in which this spherical silicone-rubber powder is covered with a silicone resin.

A silicone resin possesses a structure in which Si—O bonds are crosslined three-dimensionally in network shapes, is excellent in the heat resistance especially, hardly undergoes any weight change even at 400° C., does not undergo any thermal fusion, either, and does not swell in or dissolve into many organic solvents. As this silicone resin, a polyorganosilsesquioxane resin can be named.

This polyorganosilsesquioxane resin is a solid resinous polymerized substance having siloxane units that are specified by a general formula, $R^4$SiO$_{3/2}$. Here, $R^4$ can be one member or two members or more being selected from the group consisting of the following: monovalent organic groups comprising carbon atoms in a quantity of from 1 to 20 and being selected from the group consisting of alkyl groups, such as methyl, ethyl, propyl, butyl, pentyl, hexyl, heptyl, octyl, decyl, dodecyl, tetradecyl, hexadecyl and octadecyl; cycloalkyl groups, such as cyclopentyl, cyclohexyl and cyclooctyl; aryl groups, such as phenyl and tolyl; or the monovalent organic groups in which halogen atoms substitute partially for the hydrogen atoms being bonded to the carbon atoms. However, it is preferable that 90% by mol or more of them can be a methyl group.

The surface of a spherical silicone-rubber powder can be covered with a silicone resin by a production process for such a silicone composite powder in which a spherical silicone-rubber powder is covered with a silicone resin, the production step comprising the steps of: holding an aqueous dispersion of the spherical silicone-rubber powder to be alkaline; and hydrolyzing and then condensing the silicone resin, for instance.

Such a silicone composite powder is excellent in the heat resistance, cold resistance, shock resistance, and lubricating property. Moreover, it is believed that the silicon composite powder shows rubber elasticity in a wide temperature range of from −50° C. to 300° C. Since the silicone composite powder comprises the silicone resin covering the surface, it exhibits good dispersibility compared with that of the spherical silicone-rubber powder, and can thereby disperse satisfactorily in the active-material layer. Moreover, since the silicone resin exhibits high heat resistance compared with that of the spherical silicone-rubber powder, it is believed that a temperature range where the silicone composite rubber shows rubber elasticity becomes wider than that of the spherical silicone-rubber powder.

The aforementioned silicone composite powder is commercially available from SHIN-ETSU CHEMICAL Co., Ltd. as "KMP-600," "KMP-601," "KMP-602," "KMP-605" and "X-52-7030" under the name of "hybrid silicone powder."

When a total amount of the active-material layer is taken as 100% by mass, it is preferable that the aforementioned buffer material can be contained in an amount of from 1% by mass to 20% by mass. By means of containing the aforementioned buffer material in an amount of from 1% by mass to 20% by mass, it is possible to adapt a negative electrode into one which is of high capacity and is good in the cyclability.

Moreover, a particle diameter of the silicone composite powder can desirably be from 1 μm to 10 μm, more desirably from 1 μm to 5 μm. In order to alleviate the volumetric changes of Si and Sn, it is desirable that the silicone composite powder can have a particle diameter that is the same extent of size as those of Si and Sn. When the particle diameter of the silicone resin composite powder is smaller than the particle diameters of Si and Sn too much, the alleviation effect becomes less, whereas the silicone composite powder does not spread throughout the resulting electrode entirely so that the alleviation effect comes not to be expectable when the former is larger than the latter too much.

These active material, conductive additive and buffer material are bound on the current collector via the binder.

Although the binder is not limited especially, it is preferable that the binder can include a polyimide resinous cured substance, or an alkoxy group-containing silane-modified polyimide resinous substance.

By means of using a polyimide resinous cured substance or an alkoxy group-containing silane-modified polyimide resinous cured substance, it is possible to adapt the binder into one which has a polyimide framework.

Since the binder possesses a polyimide framework, the binder exhibits a high strength and is excellent in the heat resistance and durability. Moreover, since an alkoxy group-containing silane-modified polyimide resinous cured substance is a hybrid of resin and silica, it exhibits good adhesiveness to all of the inorganic components, that is, the current collector, the active material and the conductive additive as well as to the buffer material, and can firmly hold the active material, and the like, on the current collector.

Moreover, the manufacturing process for negative electrode for lithium-ion secondary battery according to the present invention has an applying step, and a curing step.

The "applying" means to put a binder resin, an active material, a conductive additive and a buffer material onto a current collector. As for an application method, it is possible to use the following application methods that have been used generally when making electrodes for secondary battery: roll coating methods; dip coating methods; doctor blade methods; spray coating methods; and curtain coating methods, and the like.

The binder resin is used as a binding agent when applying these active material, conductive additive and buffer material to the current collector. It is required for the binding resin to bind the active material, and the like, together in an amount as less as possible, and it is desirable that this amount can be from 0.5 wt. % to 50 wt. % of a summed total of the active material, the conductive additive, the buffer material and the binder resin.

It is preferable that the binder resin being used in the present invention can be a polyimide resin, or an alkoxy group-containing silane-modified polyamic acid resin.

An alkoxy group-containing silane-modified polyamic acid resin makes a hybrid of resin and silica. Because of being a hybrid of resin and silica, the adhesiveness is good to all of the inorganic components, that is, the current collector, the active material and the conductive additive, and it is possible to firmly hold the active material and the conductive additive on the current collector.

It is possible to synthesize the aforementioned binder resin by means of publicly-known technique. For example, in the case of using an alkoxy group-containing silane-modified polyamic acid resin as the binder resin, the binder resin can be formed by reacting precursors, namely, a polyamic acid comprising a carboxylic-acid-anhydride component and a diamine component, and an alkoxysilane partial condensate. As for the alkoxysilane partial condensate, it is possible to use those which are obtained by condensing hydrolysable alkoxysilane monomers partially in the presence of acid or base catalyst and water. On this occasion, it is also permissible that the alkoxy group-containing silane-modified polyamic acid resin can be formed as follows: the alkoxysilane partial condensate is reacted with an epoxy compound in advance to turn it into an epoxy group-containing alkoxysilane partial condensate; and the resulting epoxy group-containing alkoxysilane partial condensate is then reacted with the polyamic acid.

Moreover, as for the aforementioned binder resin, it is possible to use commercial products suitably. For example, a commercial product, "COMPOCERAN H800 (product name)" (produced by ARAKAWA CHEMICAL INDUSTRIES, LTD.), one of alkoxy group-containing silane-modified polyamic acid resins, is available.

Shown below is a chemical formula of the basic framework for aforementioned "COMPOCERAN H800 (product name)" (produced by ARAKAWA CHEMICAL INDUSTRIES, LTD.).

(Chemical Formula 1)

"COMPOCERAN H800"

As for the conductive additive, it is possible to add the following, namely, carbonaceous fine particles: carbon black, graphite, acetylene black, KETJENBLACK, carbon fibers, and the like, independently; or to combine two or more species of them to add.

At the application step, it is possible to apply the binder resin, active material, conductive additive and buffer material onto the current collector after mixing them in advance and then turning them into a slurry by adding a solvent, or the like, to the resulting mixture. It is preferable that an applied thickness can be from 10 µm to 100 µm.

Moreover, it is preferable that a mixing proportion of the binder resin, active material, conductive additive and buffer material can be the active material:the buffer material:the conductive additive:the binder resin=from 79:1:5:15 to 60:20:5:15 by parts by mass (or % by weight). Note that this mixing proportion specifies the upper limit and lower limit of each of the components. In the case of the active material, the upper limit is 79% by weight, and the lower limit is 60% by weight, for instance. In other words, when a total amount of the active-material and the buffer material is taken as 100 parts by mass, it is preferable that the active-material can be contained in an amount of from 75 parts by mass to 99 parts by mass and the buffer material can be contained in an amount of from 1 parts by mass to 25 parts by mass.

The curing step is a step of curing the binder resin. On this occasion, it is necessary that the curing condition can be a curing condition under which the binder resin cures, the buffer material, a silicone composite powder, maintains the powdery configuration, and the silicone composite powder shows rubber elasticity.

In the case of using a polyimide resin or an alkoxy group-containing silane-modified polyamic acid resin as the binder resin, the current collector onto which the active material, and the like, are applied is heated at a temperature of from 150° C. or more to 300° C. or less.

By means of carrying out the curing under this curing condition, it is believed that a silicone composite powder retains its configuration and rubber elasticity and then functions as the buffer material.

Moreover, these binder resins have an amic acid group. By means of heat treating an amic acid group, it is imidized (or it undergoes dehydration condensation) to form an imide group. This imidization reaction starts at 150° C. approximately, and is likely to proceed at 200° C. or more. It is desirable that a degree of imidization of the amic acid group can be 70% or more; to be concrete, it is preferable to imidize the binder resins until they have an imide group and an amic acid group in a proportion of from 99:1 to 70:30. The degree of imidization becomes 70% or more at 200° C. or more.

Therefore, as far as the temperature falls within the aforementioned range, the binder resins function as a binder, and so it is possible to maintain the cyclability of negative electrode satisfactorily.

Hereinafter, the present invention will be explained in more detail while giving examples.

EXAMPLES

Hereinafter, the present invention will be explained in more detail while giving one of the examples.

The negative electrode for lithium-ion secondary battery according to the present invention was made as follows, and then a charging/discharging efficiency test and a cyclic test were carried out using a model battery for evaluation. In the tests, a laminated lithium-ion secondary battery was used, laminated lithium-ion secondary battery in which the negative electrode was adapted into an electrode to be evaluated.

(Making of Electrodes for Evaluation)

Electrodes were made using an Si powder as the active material, and using an alkoxy group-containing silane-modified polyamic acid resin as the binder resin, alkoxy group-containing silane-modified polyamic acid resin which had a structure being specified in (Chemical Formula 2) below; whose solvent composition was N,N-dimethylacetamide (or DMAc); which had cured residuals in an amount of 15.1%; which exhibited a viscosity of 5,100 mPa·s at 25° C.; and which had silica in an amount of 2% by weight in the cured residuals.

(Chemical Formula 2)

where "$R^1$" is 3,3',4,4'-biphenyltetracarboxylic dianhydride;

"$R^2$" is 4,4'-diaminodiphenyl ether;

"$R^3$" is a methyl group;

"$R^4$" is a methoxy group;

"q" is from 1 to 2,500;

"r" is from 1 to 100; and

"m" is from 1 to 5

On this occasion, a silicone composite powder ("KMP-600" produced by SHIN-ETSU CHEMICAL Co., Ltd.), namely, a powder with 5-µm average particle diameter, was used. Moreover, as the conductive additive, a carbonaceous conductive additive was used; to be concrete, from 2 to 3 species of KETJENBLACK (or "KB" produced by KETJENBLACK INTERNATIONAL Corp.), graphite, and the like, were mixed to use.

As the Si powder, Si particles (produced by FUKUDA METAL FOIL & POWDER Co., Ltd.) with 10-µm-or-less maximum particle diameter and with 2-µm average particle diameter were made use of as they were.

As Example No. 1 and Comparative Example No. 2, the constituent elements were mixed in the following proportion: Si:the silicone composite powder:the carbonaceous conductive additive:the binder resin (i.e., alkoxy group-containing silane-modified polyamic acid resin)=60:5:20:15 (% by weight). As Comparative Example No. 1, the constituent elements were mixed in the following proportion without using any buffer material:Si:the carbonaceous conductive additive:the binder resin (i.e., alkoxy group-containing silane-modified polyamic acid resin)=60:25:15 (% by weight).

A slurry was prepared in Example No. 1 as follows: 60%-by-weight Si powder, and 5%-by-weight silicone composite powder were put in 15%-by-weight paste in which the alkoxy group-containing silane-modified polyamic acid resin was dissolved in N-methylpyrrolidone (or NMP); 20%-by-weight carbonaceous conductive additive was further added thereto; and then the resulting mixture was mixed. In Comparative Example No. 1 and Comparative Example No. 2 as well, slurries were prepared by similar operations.

After preparing the slurries, the slurries were put on an electrolytic copper foil with 18-μm thickness, and were then formed as a film on the copper foil, respectively, using a doctor blade.

After drying the thus obtained sheets at 80° C. for 20 minutes and then removing NMP by evaporation, a current collector, which comprised the electrolytic copper foil, and negative-electrode layers, which comprised the aforementioned composite powders, were joined together firmly by adhesion by means a roller pressing machine.

In Example No. 1 and Comparative Example No. 1, these were punched out to a predetermined configuration, and were then heat cured at 200° C. for 3 hours in order to adapt them into an electrode with 25-μm thickness approximately, respectively. Moreover, in Comparative Example No. 2, they were heat cured at 430° C. for 10 minutes in order to adapt them into an electrode with 25-μm thickness approximately, respectively.

Note that, in the silicone composite powder which had undergone the 200-° C. heat treatment, its configuration did no change.

Figure 4:
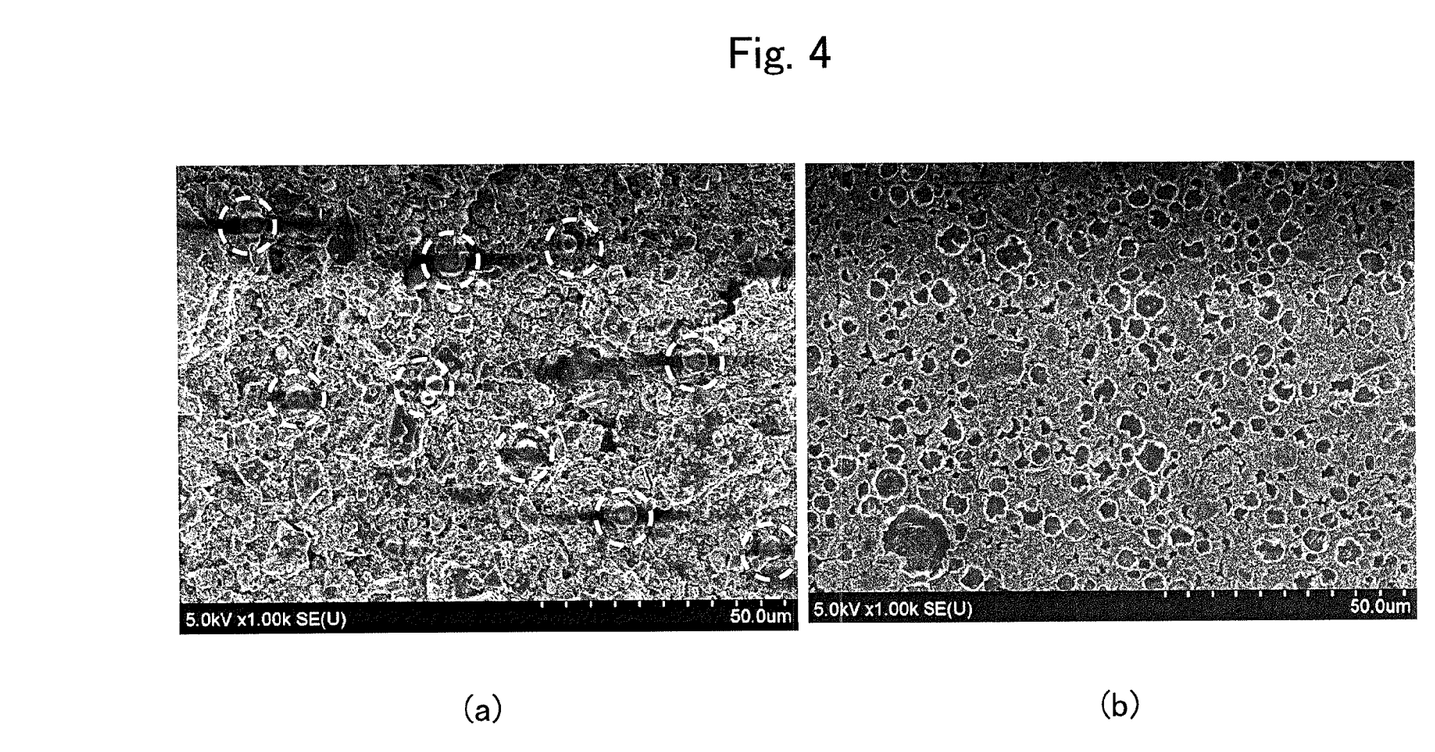
FIG. 4 is SEM photographs in which (a) shows an electrode according to Example No. 1 of the present invention and (b) shows an electrode according to Comparative Example No. 2.

In order to show the above, an SEM photograph of the electrode according to Example No. 1, and an SEM photograph of the electrode according to Comparative Example No. 2 are exhibited in (a) and (b) in FIG. 4, respectively. In this instance, the alkoxy group-containing silane-modified polyamic acid resin according to Example No. 1 exhibited a degree of imidization of 80% approximately.

As indicated with the circled marks in the SEM photograph of Example No. 1 that is shown in (a) in FIG. 4, it was understood that, in the 200-° C. heat-treated product according to Example No. 1, the silicone composite powder remained without any change in the configuration. On the contrary, in the SEM photograph of the 430-° C. heat-treated product according to Comparative Example No. 2 that is shown in (b) in FIG. 4, the silicone composite powder disappeared, and voids (or black circular parts that are represented in (b) in FIG. 4) were observed instead.

Figure 5:
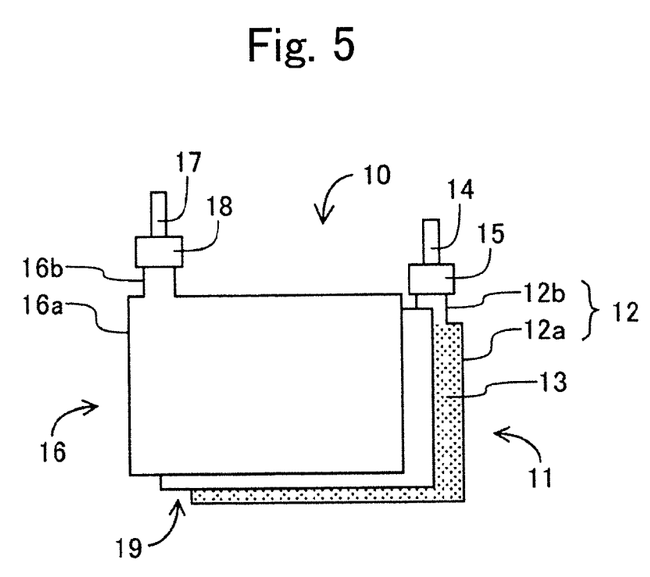
FIG. 5 is an explanatory diagram that shows a constitution of an electrode assembly in a laminated cell.

The constitution of the negative electrode being obtained as aforementioned will be explained using FIG. 5. FIG. 5 is an explanatory diagram that shows the constitution of an electrode assembly in a laminated cell, and the negative electrode being made in accordance with the aforementioned procedure corresponds to the electrode 11 in FIG. 5.

The electrode 11 comprises a sheet-shaped current-collector foil 12 being composed of a copper foil, and a negative-electrode active-material layer 13 being formed on a surface of the current-collector foil 12. The current-collector foil 12 is provided with a rectangle-shaped mixture-material-applied portion 12a (26 mm×31 mm), and a tab-welded potion 12b extending out from a corner of the mixture-material-applied portion 12a. On one of the surfaces of the mixture-material-applied potion 12a, the negative-electrode active-material layer 13 is formed. As described above, the negative-electrode active-material layer 13 includes the Si powder, the carbonaceous conductive additive, the binder, and the silicone composite powder.

To the tab-welded portion 12b of the current-collector foil 12, a tab 14 being made of nickel was resistance welded. In addition, around the tab-welded portion 12b, a resinous film 15 was wrapped.

In the same manner as above, an electrode was prepared, electrode in which $LiNi_{1/3}Co_{1/3}Mn_{1/3}O_2$ serving as the positive-electrode active material was bound on a 20-μm aluminum foil using PVdF as the binder resin; and was adapted into a positive electrode having 90 μm or less in thickness.

(Making of Laminated Batteries)

The aforementioned electrode was adapted into a negative electrode; the electrode having 85 g min thickness, in which $LiNi_{1/3}Co_{1/3}Mn_{1/3}O_2$ was adapted into the positive-electrode active material, was adapted into a positive electrode; and a solution, namely, 1-mol $LiPF_6$/ethylene carbonate (or EC)+ diethyl carbonate (or DEC) where EC:DEC=1:1 (by volume ratio), was adapted into an electrolyte, thereby making laminated batteries.

A laminated battery is provided with an electrode assembly 10, which is made by laminating an electrode 11, a counter electrode 16 and a separator 19; a laminated film (not shown), which wraps around the electrode assembly 10 to encapsulate it; and a nonelectrolyte solution to be injected into the laminated film. A procedure of making a laminated cell will be explained using FIG. 5.

The electrode 11 was constituted as having been explained already. For the counter electrode 16, a positive electrode including $LiNi_{1/3}Co_{1/3}Mn_{1/3}O_2$ was used. In this positive electrode, an aluminum foil having 20 μm in thickness was used as the current collector, the capacity was 3.0 mAh/cm$^2$, and the electrode density was 2.3 g/cm$^2$.

The counter electrode 16 was constituted as follows: it was provided with a rectangle-shaped mixture-material-applied portion 16a (25 mm×30 mm), and a tab-welded potion 16b extending out from a corner of the main-body portion 16a in the same manner as the electrode 11; and all of the above were composed of an aluminum foil. On one of the surfaces of the mixture-material-applied potion 16a, a positive-electrode active-material layer including $LiNi_{1/3}Co_{1/3}Mn_{1/3}O_2$ was formed. To the tab-welded portion 16b, a tab 17 made of aluminum was resistance welded. In addition, around the tab-welded portion 16b, a resinous film 18 was wrapped.

For the separator 19, a rectangle-shaped sheet (27 mm×32 mm, and 25 μm in thickness) being composed of a polypropylene resin was used. The mixture-material-applied portion 12a of the electrode 11, the separator 19, and the mixture-material-applied portion 16a of the counter electrode 16 were laminated in this order so that the negative-electrode active-material layer and the positive-electrode active-material layer faced to each other by way of the separator 19, thereby constituting the electrode assembly 10.

Next, after covering the electrode assembly 10 with two pieces of laminated films making a set and then sealing them at the three sides, a predetermined nonelectrolyte solution was injected into the laminated films that were turned into a bag shape. Thereafter, the remaining other sides were sealed, thereby obtaining a laminated cell whose four sides were sealed airtightly, and in which the electrode assembly 10 and the nonelectrolyte solution were encapsulated. Note that a part of the tabs 14 and 17 of the both electrodes projects outward in order for the electric connection with the outside.

(Evaluations of Laminated Batteries)

Evaluations of each of the electrodes to be evaluated in these model batteries were carried out by the following methods.

(Charging/Discharging Efficiency Test)

The aforementioned negative electrodes according to Example No. 1 and Comparative Example No. 1 were used in order to carry out a charging/discharging test, and then the charging/discharging efficiency (%) was calculated, respectively.

During a first cycle, a CCCV charging (i.e., constant-current and constant-voltage charging) operation was carried out at 0.2 C up to 4.25 V for 10 hours. Thereafter, they were discharged at a constant electric current of 0.2 C down to 2.6 V (that is, a CC discharging (i.e., constant-current discharging) operation at 0.2 C). The current was held at a constant current of 4.6 mA.

During a second cycle, another CCCV charging (i.e., constant-current and constant-voltage charging) operation was carried out at 0.2 C up to 4.25 V for 10 hours. Thereafter, they were discharged at a constant electric current of 1 C (i.e., 23 mA) down to 2.6 V (that is, a CC discharging (i.e., constant-current discharging) operation at 1 C).

The charging/discharging efficiency was calculated using the following equation.

Charging/Discharging Efficiency (%)={(Discharged Capacity)/(Charged Capacity)}×100

On this occasion, an electric current that makes an electric capacity discharge for 1 hour is expressed as 1 C, and another electric current that makes the same discharge for 5 hours is expressed as 0.2 C. Therefore, the current value of 1 C is five times as much as the current value of 0.2 C.

Figure 2:
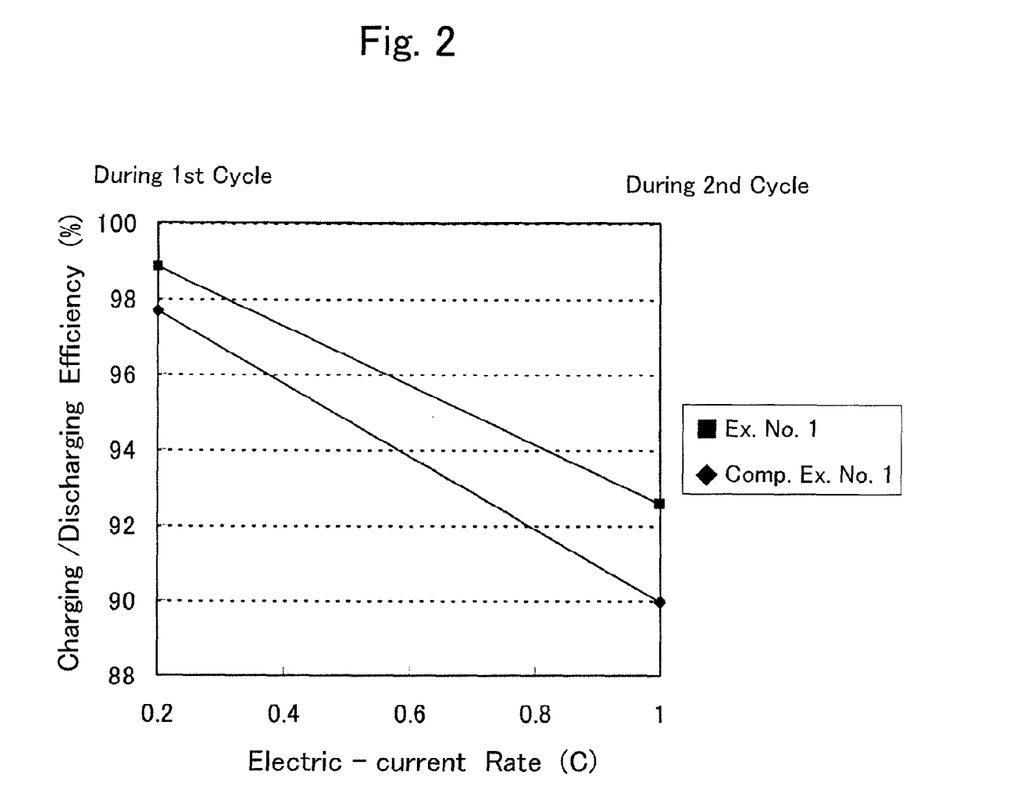
FIG. 2 is a graph that compares the charging/discharging efficiency of Example No. 1 according to the present invention and that of Comparative Example No. 1.

A graph is shown in FIG. 2, graph which compares the charging/discharging efficiencies that the model batteries using the electrodes according to Example No. 1 and Comparative Example No. 1 exhibited during the above first cycle and second cycle. The X axis represents the aforementioned current rates, and the Y axis represents the charging/discharging efficiencies (%).

As can be seen from FIG. 2, in the electrode according to Example No. 1, the charging/discharging efficiency was 99% during the first cycle (or at 0.2 C) and it was 93% during the second cycle (or at 1 C); that is, the electrode according to Example No. 1 exhibited charging/discharging efficiencies that were higher by about 1% at the time of 0.2 C, and even by about 3% at the time of 1 C, than did Comparative Example No. 1. To put it differently, it was understood that the electrode according to Example No. 1 can discharge the charged capacities securely, compared with the electrode according to Comparative Example No. 1. This is believed to result from the following: the aforementioned silicone composite powder worked as a buffer material to absorb the volumetric change of the Si particles, an active material; and thereby it was possible to prevent the binder from being destroyed, and to eventually prevent the active material from coming off or falling down. Moreover, since the difference between the charging/discharging efficiencies were greater at 1 C than at 0.2 C in Example No. 1, compared with that in Comparative Example No. 1, it is understood that the aforementioned advantage is effected greatly, especially, at the time of rapid charging/discharging.

(Cyclic Test)

As charging, a CCCV charging (i.e., constant-current and constant-voltage charging) operation was carried out at 0.2 C up to 4.25 V for 10 hours. As discharging, they were discharged at a constant electric current of 0.2 C down to 2.6 V (that is, a CC discharging (i.e., constant-current discharging) operation at 0.2 C). (1 C capacity=23 mAh)

While adapting those above into 1 cycle, charging and discharging was carried out repeatedly, thereby examining the discharged capacities.

Figure 3:
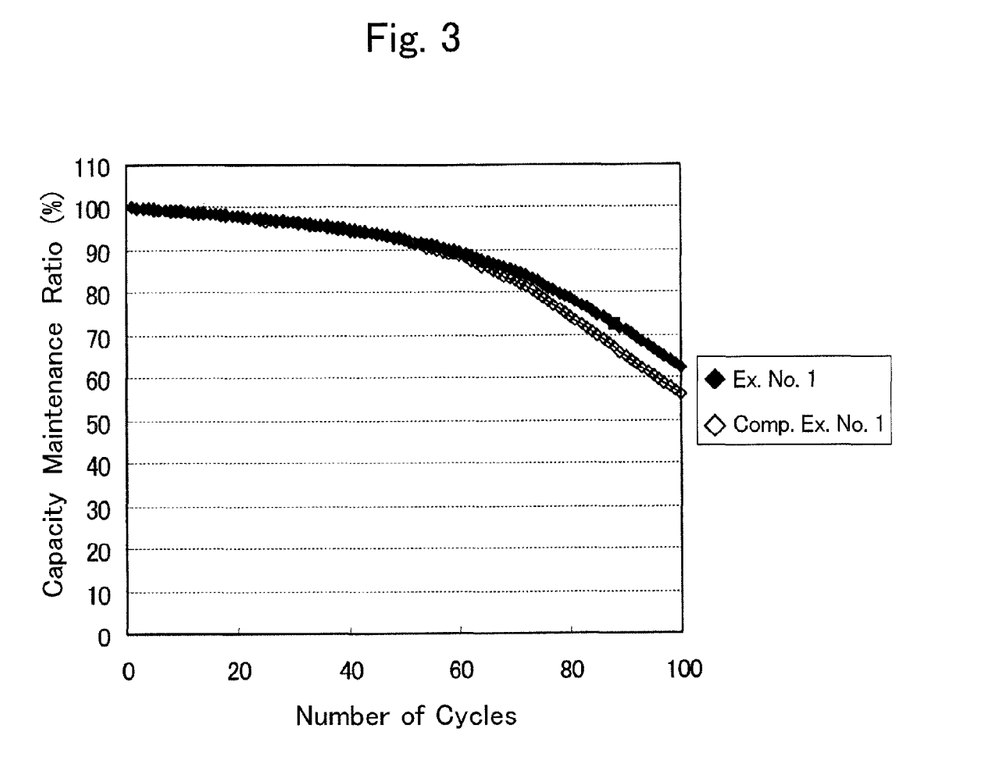
FIG. 3 is a graph that shows results of a cyclic test on Example No. 1 according to the present invention and those on Comparative Example No. 1.

A graph is shown in FIG. 3, graph which shows the relationships between the number of cycles and the capacity maintenance rates (%) with regard to the model batteries that had the electrodes according to Example No. 1 and Comparative Example No. 1, respectively. First of all, the declining rate became less from about during the 70th cycle in the battery in which the electrode according to Example No. 1 was adapted into the electrode to be evaluated, compared with that in the battery in which the electrode according to Comparative Example No. 1 was adapted into the electrode to be evaluated, as can be apparent from FIG. 3. Moreover, it was understood that the capacity maintenance rate was 55% approximately after the 100th cycle in Comparative Example No. 1, whereas the capacity maintenance rate was 62% approximately after the 100th cycle in Example No. 1.

In other words, it was understood from the results of this cyclic test that the electrode according to Example No. 1 was better in the cyclability than was the electrode according to Comparative Example No. 1. This is believed to result from the following: the aforementioned silicone composite powder worked as a buffer material; and thereby it was possible to prevent the active material from coming off or falling down. Moreover, from the results of the aforementioned charging/discharging efficiency test, it seems that, at the time of rapid charging/discharging (or in the case where the discharging rate is 1 C, for instance), the advantage becomes more conspicuous in the results of the cyclic test as well.

Although an alkoxy group-containing silane-modified polyamic acid resin was used as the binder resin in the aforementioned example and comparative examples, similar advantages are obtainable even from using a polyimide resin.

The invention claimed is:

1. A negative electrode for a lithium-ion secondary battery, the negative electrode comprising:
    a current collector; and
    an active-material layer being bound on a surface of said current collector,
    said active-material layer including an active material, a binder, a conductive additive, and a buffer material;
    said active material including Si and/or Sn; and
    said buffer material comprising a silicone composite powder in which a spherical silicone-rubber powder is covered with a silicone resin, wherein said buffer material is contained in an amount of from 1% by mass to 20% by mass when a total amount of said active-material layer is taken as 100% by mass.

2. The negative electrode for the lithium-ion secondary battery as set forth in claim 1, wherein said binder includes a polyimide resinous cured substance, or an alkoxy group-containing silane-modified polyimide resinous cured substance.

3. A manufacturing process for a negative electrode for a lithium-ion secondary battery comprising:
    an applying step of applying a binder resin comprising a polyimide resin or an alkoxy group-containing silane-modified polyamic acid resin, an active material including Si and/or Sn, a conductive additive, and a buffer material comprising a silicone composite powder in which a spherical silicone-rubber powder is covered with a silicone resin onto a surface of a current collector, wherein said buffer material is contained in an amount of from 1% by mass to 20% by mass when a total amount of said active-material layer is taken as 100% by mass; and
    a curing step of curing said binder resin, which has been applied on said current collector, in a range of from 150° C. or more to 300° C. or less, thereby binding said active material, said conductive additive and said buffer material on the surface of said current collector.

* * * * *